United States Patent [19]
Spira et al.

[11] Patent Number: 5,636,472
[45] Date of Patent: Jun. 10, 1997

[54] APPARATUS FOR THE CONTINUOUS CULTIVATION OF AQUATIC MACROPHYTES

[76] Inventors: William M. Spira, 14221 Park Ave. S., Burnsville, Minn. 55337; Paul W. Skillicorn, 707 Pamplona, Davis, Calif. 95616

[21] Appl. No.: 526,077

[22] Filed: Sep. 11, 1995

[51] Int. Cl.⁶ .................................................. A01G 33/00
[52] U.S. Cl. .......................... 47/1.4; 210/602; 210/150; 210/926
[58] Field of Search .................. 47/1.4, 65; 210/602, 210/626, 629, 608, 150, 926

[56] References Cited

U.S. PATENT DOCUMENTS

| | | | |
|---|---|---|---|
| 2,732,663 | 1/1956 | Dewey | 47/1.4 |
| 3,495,712 | 2/1970 | Schreiber | 210/629 |
| 4,041,640 | 8/1977 | Itanami et al. | 47/1.4 |
| 4,146,478 | 3/1979 | Rongved | 210/926 |
| 5,264,127 | 11/1993 | Ngo et al. | 210/602 |
| 5,437,786 | 8/1995 | Horsley et al. | 210/170 |

*Primary Examiner*—James R. Feyrer
*Attorney, Agent, or Firm*—John D. Kramm

[57] ABSTRACT

An apparatus for cultivating macrophytes grown on the water surface in a circular basin structure containing a channel of plant growth nutrients water spiraling from the basin structure periphery into the center of the basin structure and then back out again to the periphery. Two spiraling berms, constructed in parallel, define the single, continuous channel of water. A conveyor means is mounted on a rotatable arm that extends from the basin structure center to the basin structure periphery and rotates about the central support. The conveyor means moves laterally along the rotatable arm so as to remain in the center of the channel of water as that arm rotates. A portion of the floating macrophytes on the water surface is harvested one or more times each day and transported to beyond the periphery of the basin structure where the floating macrophytes are available for subsequent processing. The proportion of plant cover harvested can be controlled by adjustments to the conveyor means and by adjusting the speed at which the rotatable arm rotates. The rotatable arm contains a means for dispensing macrophytes with water jet heads that mix and redistribute the plant cover after the conveyor means has passed through.

7 Claims, 8 Drawing Sheets

APPARATUS FOR THE CONTINUOUS CULTIVATION OF AQUATIC MACROPHYTES

BACKGROUND OF THE INVENTION

The present invention relates to a biomass producing apparatus and in particular to the cultivation of aquatic macrophytes floating on water having plant growth nutrients.

For many years, floating aquatic plants have been cultivated both as food sources for fish and other animals and for treating wastewater and/or improving water quality. Plants such as water hyacinth, water chestnuts, water lettuce, heartleaf, hydrillas, azollas, and members of the duckweed and liverwort families have proven effective for water treatment. Water hyacinth growing profusely on sewage promotes good effluent quality but has not proven to be a marketable or otherwise attractive commodity.

Applying duckweed (scientific name: Lemnaceae) as a macrophyte cover on a pond or lagoon has distinct advantages over water hyacinth and other more fibrous plants for producing a more marketable biomass with a higher protein content. Duckweeds are found worldwide; they grow on nutrient rich water to form a complete cover on the water surface; they show exceptional productivity per unit area; and have shown that they were excellent fodder for fish, poultry and cattle. Because of this, duckweed can be grown as an attractive and marketable commodity.

Duckweed species can survive extremely adverse conditions. Their growth rate is, however, highly sensitive to nutrient loading and nutrient balance, temperature, and pH. For duckweed to thrive and grow at maximum rates, these four factors need to be maintained at near optimal levels.

In addition, maximizing the yield from a duckweed pond or lagoon demands careful crop management to maintain a complete plant cover on the surface of the water but one that is not so dense that crowding becomes significant. The complete cover is important to suppress algae growth in the water, which reduces pH elevation caused by algal respiration. Crowding must be avoided because it greatly reduces productivity and adversely affects the vigor of the plants. Given the extremely rapid growth rates of a healthy population of duckweed, harvesting must be carried out with sufficient frequency to maintain the plant cover at an optimum density.

One known system in the U.S. for treatment of wastewater and improved water quality by use of floating aquatic plants employs a serpentine channel of water comprising several parallel, straight portions connected by U-turns. Such channels of water are commonly created by using baffles but can also be formed by berms. The channels establish a flow that nearly approximates a plug-flow situation. A floating containment grid structure covers the water surface forming a series of plant containment zones and floating aquatic plants are deployed on the surface of the water in these containment zones. This system must be harvested by a rider-mounted harvester of a design similar to harvesters used to remove other floating aquatic plants from bodies of water. Harvesting is done at intervals ranging from several weeks to several months. Based on the amount of water surface available for duckweed cultivation, this system is expensive to construct and operate, and is extremely inefficient as a source of marketable biomass.

Another known system employs channels constructed in a greenhouse for cultivating duckweed. The duckweed cover is harvested at frequent intervals and the productivity per unit area under cultivation is relatively high. Nevertheless, the cost of construction and operation is excessive for commercial applications except when a significant portion of these costs can be recouped from the value of treated wastewater or improved water produced by the facility. In most parts of the world, water does not have sufficient value to support such an operation.

With respect to cultivating duckweed and, by extension, other floating macrophytes, on plant growth nutrient water, an efficient system for crop management has not been developed. A device is needed that simultaneously supports true plug-flow conditions for water treatment or improvement and allows the macrophyte crop to be managed for improved production. Making an apparatus capable of sufficiently frequent harvesting of a portion of the macrophyte on the water surface has been a problem. Controlling the dispersion of the macrophyte cover so that areas of open water are covered and clumps of dense growth are broken up has also been shown to be a problem.

The present invention solves these and other problems related to cultivating floating aquatic plants on plant growth nutrient waters and enabling the plants to be grown and harvested frequently as a cash crop of substantial commercial value.

SUMMARY OF THE INVENTION

The present invention and apparatus is intended to take macrophytes of the type naturally growing on the surface of water and normally deriving their nutrition from said water, and to create for them a system wherein they may be cultivated continuously on plant growth nutrient water. This is accomplished by constructing a circular basin containing a continuous, shallow channel of water spiraling into the center of the structure and then out again. Plant growth nutrient water is caused to flow through this channel of water and macrophytes are grown on the water surface. Two spiral berms, constructed in parallel, define the single, continuous channel of water in which water flows in a double path.

The apparatus for the culture of aquatic macrophytes in water having plant growth nutrients comprises a basin structure of generally circular shape which presents a double path in a generally spiral shape. The double path defines a single continuous channel of water from an inlet end at the periphery of the basin to the center of said basin and then back to an outlet end adjacent to the inlet end at the periphery of the basin. For example, a double path can be made of parallel berms. Additionally, a pipe and pump can fluidly communicate with the outlet end and the inlet end so that the concentration of growth nutrients of the water through the channel of water can be controlled.

A rotatable arm is attached to a support central to the basin. The rotatable arm extends beyond the periphery of the basin and is fully rotatable around the central support. The rotatable arm bears a trough which extends beyond the berms.

A conveyor means gathers macrophytes from the water and conveys the macrophytes onto the trough whereby the macrophytes are conveyed beyond the berms. The conveyor means can have a harvester head, an auger and a tram assembly. As the rotatable arm rotates about the central support, the tram assembly moves the harvester head and auger laterally along the rotatable arm to keep the conveyor means in the center of the channel of water throughout the basin structure. A portion of the floating macrophyte on the water surface is harvested one or more times each day and transported to beyond the periphery of the basin where the macrophyte is available for subsequent processing. The proportion of plant cover harvested can be controlled by adjustments to the conveyor means and by adjusting the speed at which the rotatable arm rotates.

A means for dispersing the macrophytes over the surface of the water after a portion of said macrophytes has been harvested is also provided. The entire apparatus can be constructed as a single unit or several units can be combined into a variety of arrangements in which units are constructed in series, in parallel, or in any combination of series and parallel arrangement.

DETAILED DESCRIPTION OF THE DRAWINGS

Figure 1:
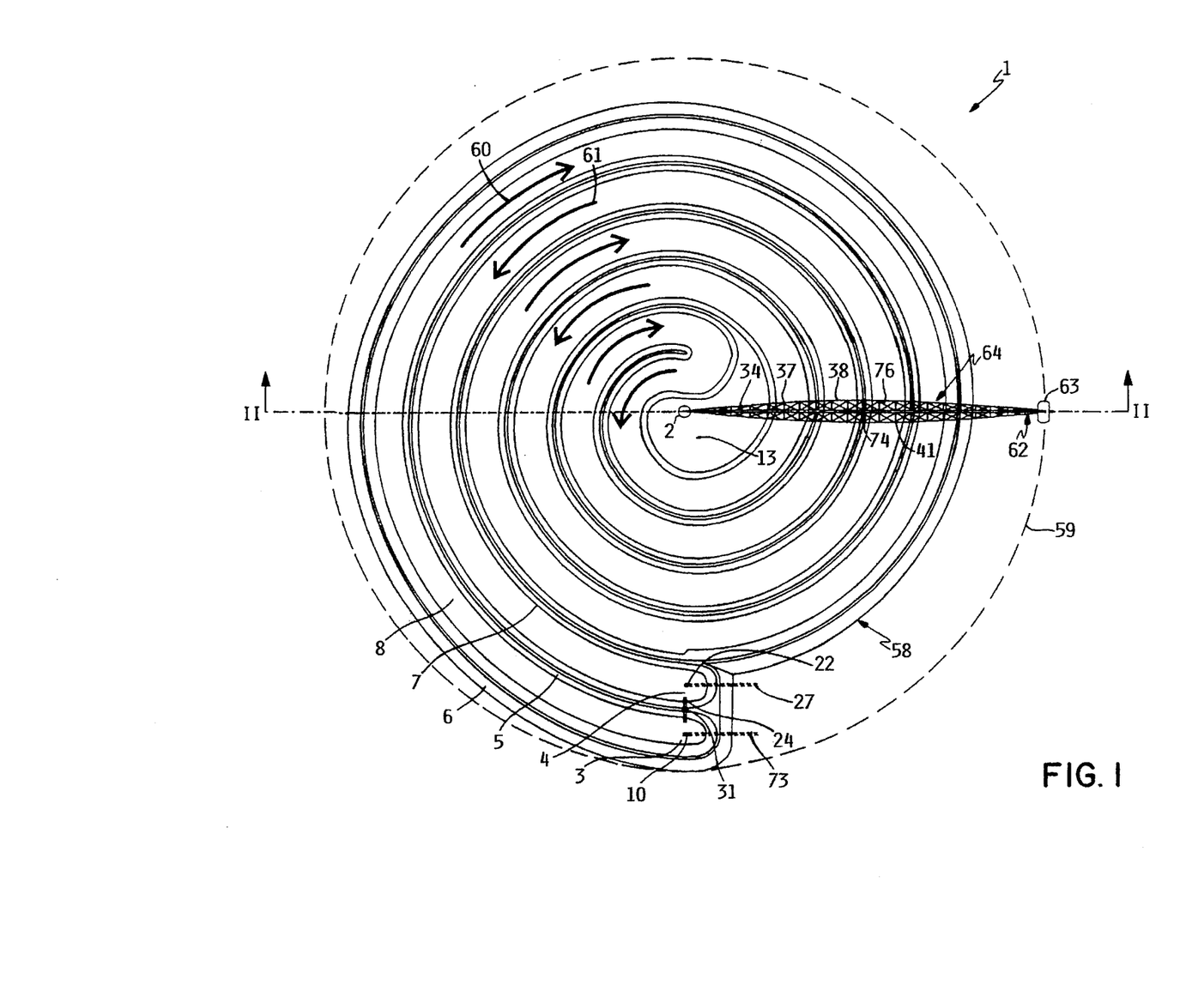
FIG. 1 is a top plan view of a macrophyte aquaculture apparatus illustrating the double path of the single, continuous channel of water.
Figure 2:
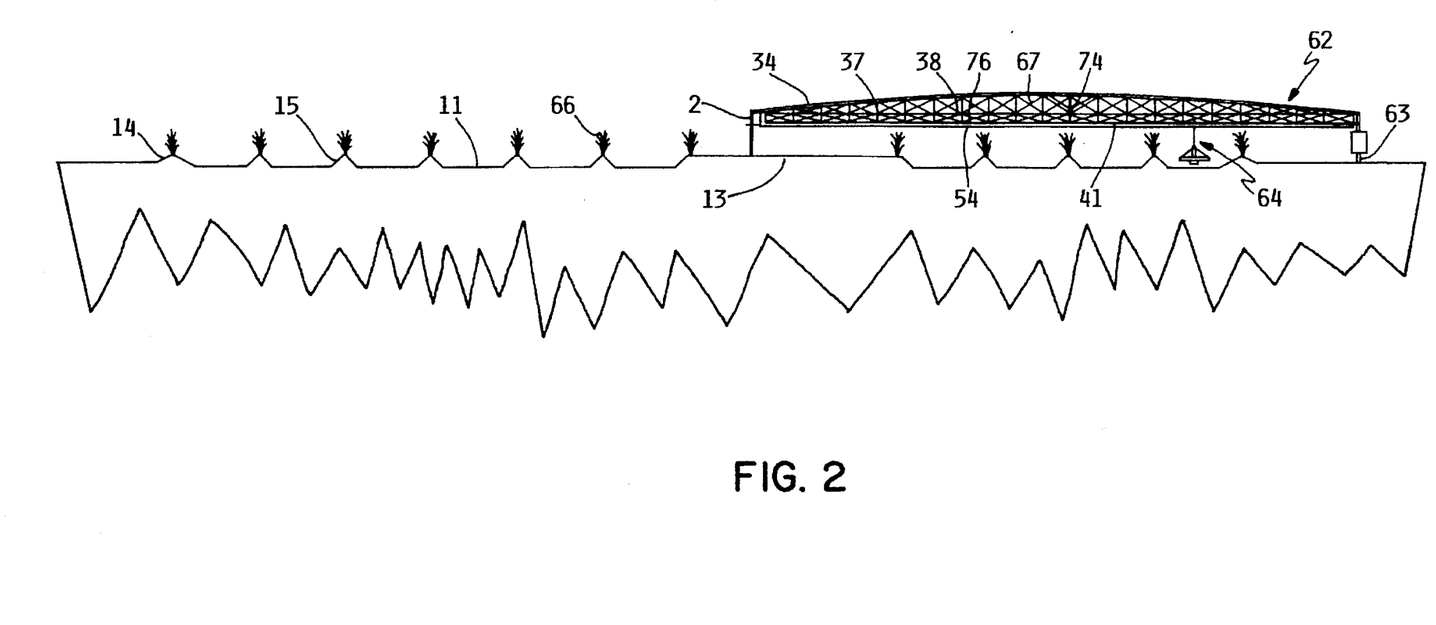
FIG. 2 is a side elevational cross-sectional view of the apparatus taken on the line 2—2 of FIG. 1 illustrating a series of berms in profile and the rotatable arm.

A typical embodiment of the macrophyte aquaculture apparatus 1 of the present invention is shown in FIG. 1 and FIG. 2. The macrophyte aquaculture apparatus 1 comprises a basin structure 58 of generally circular shape that presents a double path in a generally spiral shape. The double path defines a single continuous channel of water 8 from an inlet end 3 at the periphery of the basin structure 58 to the center of said basin structure 58 and then back to an outlet end 4 adjacent to the inlet end 3 at the periphery of the basin structure 58. In one embodiment of the invention, a double path can be made of parallel berms. A pipe 24 and pump 31 can fluidly communicate with the outlet end 4 and the inlet end 3 single continuous channel of water 8 so that the concentration of growth nutrients of the water through the channel of water 8 can be controlled.

A rotatable arm 62 at one end is attached to a central support 2 central to the basin structure 58. The rotatable arm 62 extends beyond the periphery of the basin structure 58 and is fully rotatable around the central support 2. The rotatable arm 62 bears a trough 54 that extends beyond the berms. A conveyor means 64 gathers macrophytes from the water and conveys the macrophytes onto the trough 54 where the macrophytes are conveyed beyond the berms. The conveyor means includes a harvester head 69, an auger 77 and a tram 43. A means for dispersing the macrophytes over the surface of the water after a portion of said macrophyte has been harvested is also provided.

The harvester head 69 and auger 77 moves laterally along the rotatable arm 62 to remain in the center of the channel of water 8 as the rotatable arm 62 rotates around the central support 2. A portion of the floating macrophyte on the water surface is harvested one or more times each day and transported beyond the periphery of the basin structure 58 where macrophytes are available for subsequent processing. The proportion of plant cover harvested can be controlled by adjustments to the conveyor means 64 and by adjusting the speed at which the rotatable arm 62 rotates.

The basin structure 58 forms an approximate circle shape defined by the exterior berm 6. The basin structure 58 can have in one embodiment of the invention a radius of 60 meters and can be open to the atmosphere and be exposed to direct sunlight. The mostly circular basin structure 58 presents a double path in a generally spiral shape. The double path defines a single continuous channel of water 8 from an inlet end 3 at the periphery of the basin 58 to the center of the basin 58 around the central island and then back to an outlet end 4 adjacent to the inlet end 3 at the periphery of the basin structure 58. The double path comprises an influent 60 channel of water 8 flowing toward the center island 13 and an effluent 61 channel of water 8 flowing toward the periphery of the basin 58. In one embodiment of the invention, a double path can be delimited by parallel berms. For example in FIG. 1, a double path comprises the influent 60 channel of water 8 flowing between the exterior berm 6 and the first interior berm 5 and the effluent 61 channel of water 8 flowing between the first interior berm 5 and the second interior berm 7. The purpose for the shapes of the basin structure 58, the double path and a single continuous channel of water 8 is for continuously growing and harvesting a crop of macrophytes on the water surface.

FIG. 1 shows the intersection of the rotatable arm 62 with the circular track 59 of wheel 63, the exterior berm 6, the first interior berm, the second interior berm 7, another interior berm and the central island 13. The berms have a mounded shape and contain earth or of earth and masonry construction using brick, stone, concrete aggregate or any combination of this. The berms are constructed to prevent any flow of water through the berms. The berms are planted at the berm top 21 with firmly rooted vegetation. The berm crop 66 creates an effective wind break and prevents erosion by weather.

Figure 3:
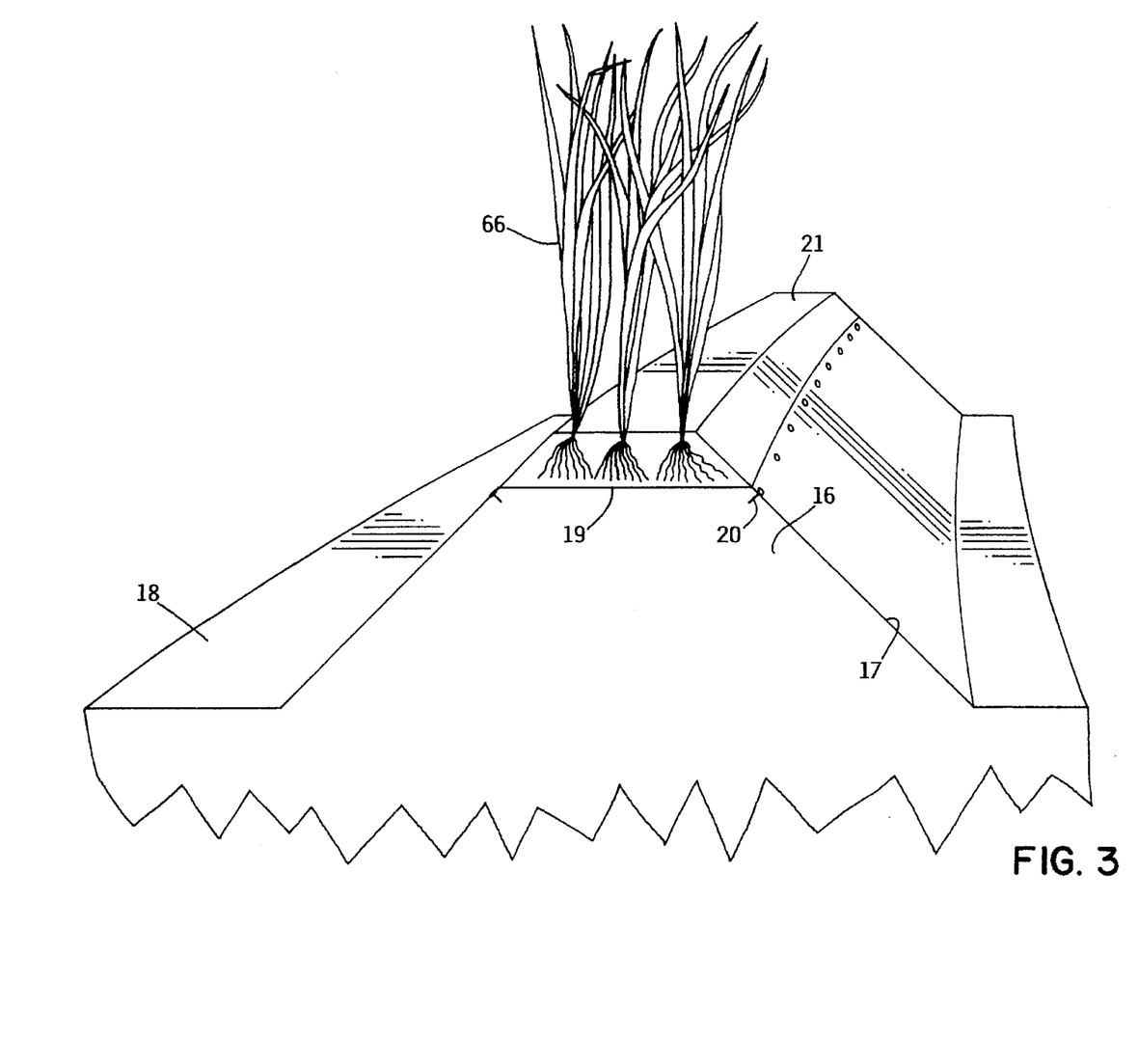
FIG. 3 is an enlarged, perspective cross-section view of an interior berm.

The exterior berm profile 14 is substantially wider than the interior berm profile 15. The exterior berm profile 14 is constructed to a slope of 2.5:1 or 3:1 compared with a slope of 1:1 for interior berms. The exterior berm 6 and interior berms have a freeboard of at least 30 cm. An example of an interior berm is shown in FIG. 3. The berm interior 16 of an interior berm consists of compacted core berm material such as earth or masonry. An agricultural grade or wastewater grade plastic liner 17 covers from a berm slope, across the entire channel bottom 18, and up to the slope of the berm opposite. This plastic liner 17 extends beyond and above the waterline and is held in place by anchors 20 along the entire length of the berm. The berm top 21 has berm fill 19 consisting of a higher quality of earth filled to a depth of approximately 40 cm. so that a berm crop 66 or grass can be cultivated on the berm top 21 to use as a windbreak for the macrophytes.

Figure 4:
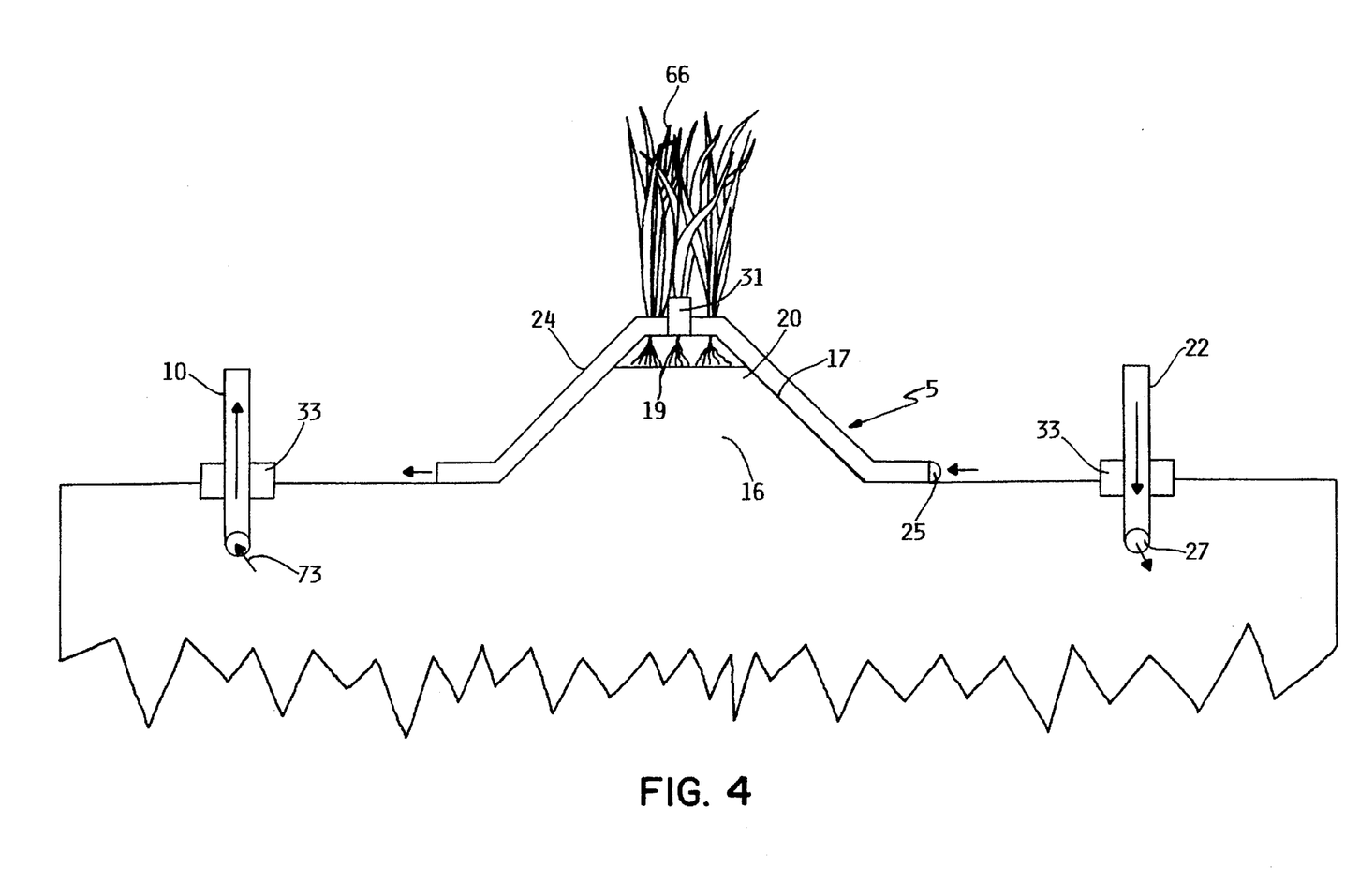
FIG. 4 is a partial side elevational cross-sectional view of an interior berm at the inlet end and the outlet end of the channel of water.

FIG. 4 shows a view of the first interior berm 5 both at the starting point and at the ending point for the channel of water 8 inside the basin structure 58. Plant growth nutrient water enters the buried inflow main 73 and ascends the inflow standpipe 10 into the channel of water 8 delimited by the exterior berm 6 and the first interior berm. The influent 60 flows toward the central island 13. After the influent 60 channel of water 8 passes around the central island 13, the channel of water 8 becomes an effluent 61, flowing toward the periphery of the basin 58. Upon reaching the end of the channel of water 8, the effluent 61 exits the channel of water 8 by descending an outflow standpipe 22 and by leaving a buried outflow main 27. Both the inflow standpipe 10 and the outflow standpipe 22 are securely held in place by a separate concrete base 33. The plastic liner 17 is sealed to all sides of the concrete base 33 to form a leak-free connection.

A pipe 24 passes over the first interior berm 5 between the inflow standpipe 10 and the outflow standpipe 22. This pipe 24 is used to recycle water from the effluent 61 at the end of the channel of water 8 to the influent 60 at the beginning of the channel of water 8. The intake of this pipe 24 is fitted with a screen 25 to prevent the passage of plant material. The pipe 24 is connected to a pump 31 for pumping effluent from the outlet end 4 to channel of water bottom 18 at the inlet end 3 for mixing with the influent 60.

As used in this description and in the appended claims, the term "channel of water" is synonymous with "channel" and with "a body of water" meaning a particular course the water takes, specifically the water itself and is to be distinguished from any actual structure that defines or determines that channel of water 8, such as parallel berms. The macrophytes float freely on the surface of the channel of water 8. The channel profile 11 shown in FIG. 2 shows a channel of water 8 with a more-or-less constant cross-sectional dimension throughout its length, with a width at the water surface no greater than 7.0 meters and with an operating water depth no greater than 1.5 meters. The channel of water 8 has an inlet end 3 and an outlet end 4 placed contiguously to each other at the periphery of the basin structure 58. Water flows into the channel of water 8 through an inflow standpipe 10 and flows out of the channel of water 8 through the outflow standpipe 22. Both standflow pipes 10 and 22 have a height that can be set to establish hydraulic control. The channel of water 8 at the outlet end 4 is operatively connected to the inlet end 3 by the pipe 24 and pump 31 to permit the recycling of a portion of the effluent into the influent as needed. For example, in a basin structure 58 where the level of the water column in the channel of water 8 is maintained between 1.0 and 1.5 meters, the flow of influent is kept at or below 500 cubic meters/day.

FIG. 1 & 2 shows the rotatable arm 62 as a bridge-like shape that spans a radius of the basin structure 58 from a raised central island 13 located at the center of the basin structure 58 to beyond the periphery of the basin structure 58. Upon this central island 13 at the geometric center of the basin structure 58 is a central support 2 for supporting one end of the rotatable arm 62. The other end of the rotatable arm 62 is supported by a wheel 63. The rotatable arm 62 can pivot 360 degrees on the central support 2 and can make a circular track 59 with the wheel 63 outside the basin structure 58. The rotatable arm 62 can be made from a standard, motorized, 60 meter irrigation device commonly used for agricultural irrigation.

Figure 5:
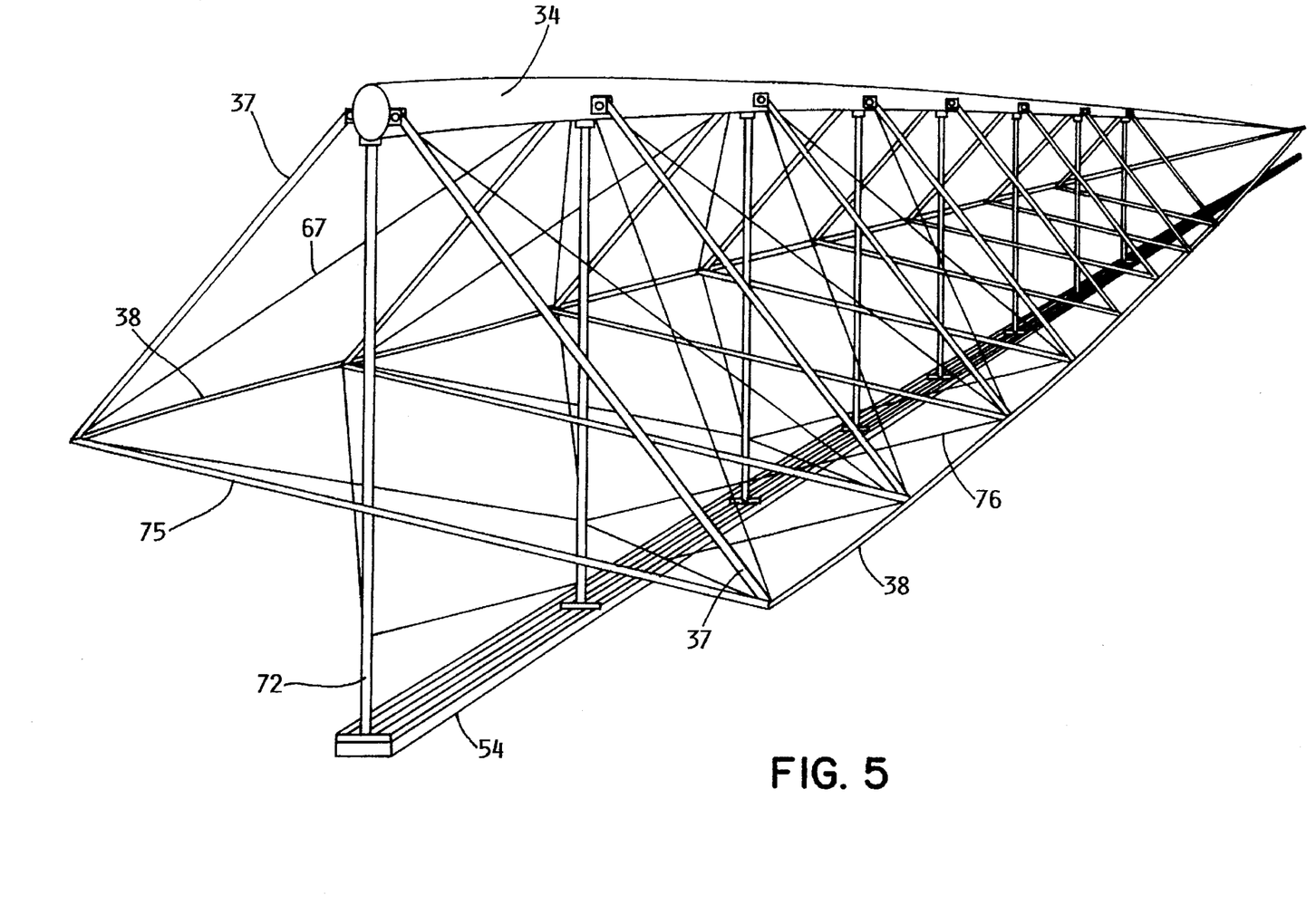
FIG. 5 is a perspective view of a section of the rotatable arm and trough viewed from the central island.
Figure 6:
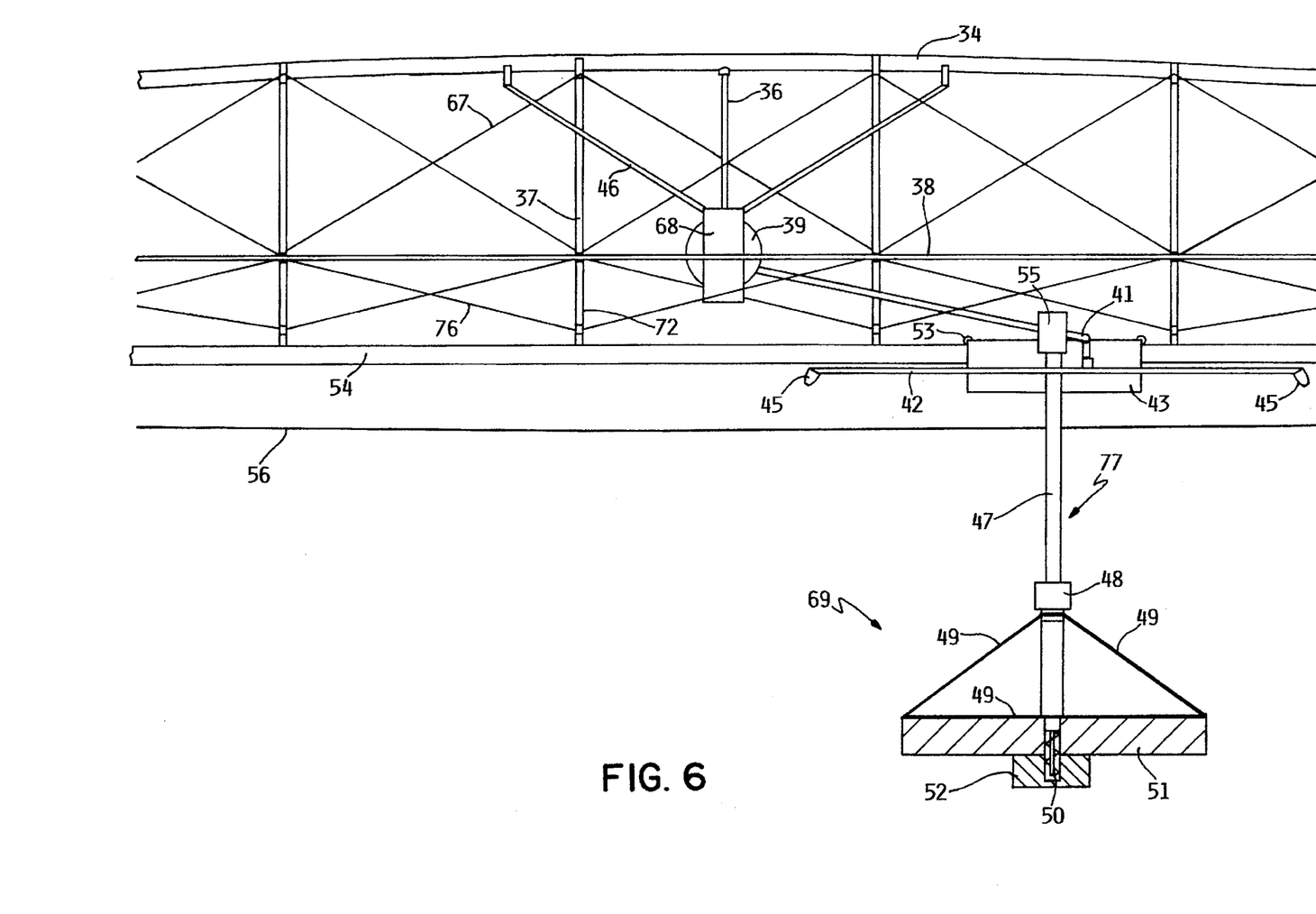
FIG. 6 is a partial, front elevational view of the rotatable arm, conveyor means and dispersing means.

FIG. 5 is a perspective view of a section of the rotatable arm 62 and trough 54 viewed from the central island. FIG. 6 is a partial, front elevational view of the rotatable arm 62, the conveyor means 64 and the dispersing means which includes the water jets pipe 42 and the water jet head 45. A cylindrical shaped main pipe span 34 runs across the top of and the length of the rotatable arm 62. Below and parallel to the main pipe span 34, an U-shaped trough 54 runs across the bottom of and the length of the rotatable arm 62 beyond the berms. The harvester trough 54 is suspended below the main pipe span 34 forming a single incline plane with a 3% slope toward the periphery of the basin structure 58. The trough 54 is secured to the main pipe span 34 by a plurality of evenly spaced, vertically aligned, trough supports 72.

Two tension cables 38 placed between the main pipe span 34 and the trough 54 extend from the trough support 72. The two tension cables 38 run parallel with each other and run parallel with the main pipe span 34 and the trough 54. The two tension cables 38 are the base vertices of a series of triangles having the main pipe span 34 at the apex. One tension cable 38 is connected to the other tension cable 38 by the bottom support strut 75. The main pipe span 34 is connected to each tension cable 38 by the spacer arm 37. The main pipe span 34 is also connected to each tension cable 38 by criss-crossing diagonal support wires 67 that makes a repeating diamond pattern across the rotatable arm 62 along the triangle sides. The trough support 72 is connected to each tension cable 38 by criss-crossing trough support wires 76 that also makes a repeating diamond pattern across the rotatable arm 62 along the triangle base. An end of the bottom support strut 75, the spacer arm 37, the trough support wire 76 the diagonal support wire 67 all connect at a similar point on portions of the tension cable 38.

The hose spool assembly 74 is secured to the middle of the rotatable arm 62 as shown in FIGS. 1, 2, 6 and 7. The hose spool housing 68 of the hose spool assembly 74 has a rectangular shape and contains the circular shaped hose spool 39. The flexible hose 41 is wound around the hose spool 39. One end of the flexible hose 41 is connected to the hose spool housing 68 and the other end of the flexible hose 41 is attached to the water jets pipe 42 of the means for dispersing macrophytes. The hose spool housing 68 is secured to the main pipe span 34 by two diagonal hose spool supports 46 and one vertical spool pipe 36. Water flows up from the central support 2, across the main pipe span 34 to the spool pipe 36. Water then descends the spool pipe 36 into the hose spool housing 68 and through the flexible hose 41. Water exits the flexible hose 41 into the water jets pipe 42 of the means for dispersing macrophytes then finally out the water jet head 45 into the channel of water 8. As the water jets pipe 42 moves farther away from the hose spool housing 68, the flexible hose 41 is unwound from hose spool 39 to maintain the fluid connection. Similarly, as the water jets pipe 42 returns closer to the hose spool housing 68, the flexible hose 41 is rewound around hose spool 39.

The conveyor means 64 is movably mounted on the trough 54 of the rotatable arm 62. The elongated, vertically oriented conveyor means 64 extends from the rotatable arm 62 into the channel of water 8 of the basin structure 58. The purpose of the conveyor means 64 is for gathering macrophytes from the channel of water 8, and for conveying the macrophytes onto the trough 54 for conveying the macrophytes beyond the berms. The conveyor means 64 translates along the trough 54 relative to the central support 2 as the rotatable arm 62 pivots about the central support 2 over the basin structure 58. The conveyor means 64 includes an auger 77 with a harvester tram 43 at one end and a harvester head 69 in the water at the other end.

The auger 77 of the conveyor means 64 has an elongated shape and vertical orientation for elevating macrophytes from the channel of water 8 to the trough 54. The auger housing 47 of the auger 77 has a hollow tube shape and is fixedly mounted to the harvester tram 43 and fluidly communicates with the auger housing outlet 65 at one end. The other end of the auger housing 47 is connected to the harvester head coupling 48 of the harvester head 69. An auger screw 50 is rotatably disposed within the auger housing 47 and has one end within the harvester head 69 extending beyond the auger housing 47 into the macrophytes and the channel of water 8. See FIG. 8. An auger motor 55 in FIG. 6 is mounted to the harvester tram 43 on the one end of the auger housing 47 and the auger screw 50. The auger motor 55 is connected to and drives the auger screw 50 to rotate the exposed end of the auger screw 50.

Figure 7:
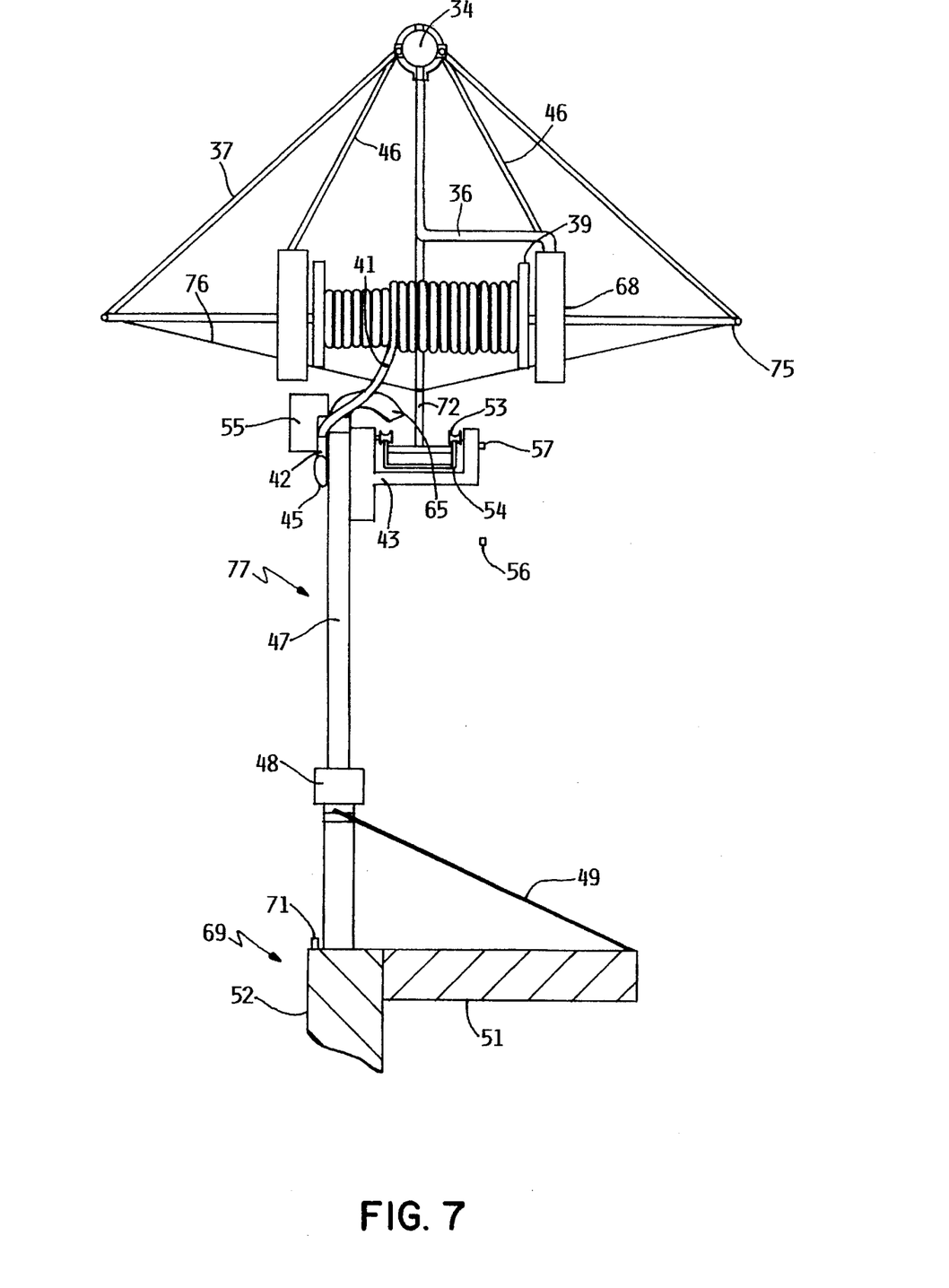
FIG. 7 is a partial side elevational view of portions of the conveyor means.

The harvester tram 43 of the conveyor means 64 has an U-shape that surrounds the bottom and sides of a portion of 54. Each top corner of the harvester tram 43 has the harvester tram wheels 53 to roll along the top sides of the trough 54. One end of the auger 77 is fixedly mounted to the harvester tram 43 for translating the conveyor means 64 along the trough 54 relative to the central support 2. The conveyor means 64 translates along the trough 54 relative to the central support 2 by means of a drive chain 57 connected to the harvester tram 43. The relative position of the return portion 56 of harvester drive chain below the trough 54 is illustrated in FIG. 7 by one link in the chain of the return portion of the harvester drive chain 56. One end of the freely hanging return portion 56 of the harvester drive chain connects with a sprocket at the central support 2 and connects to an idler at the other end of the rotatable arm 62.

Figure 8:
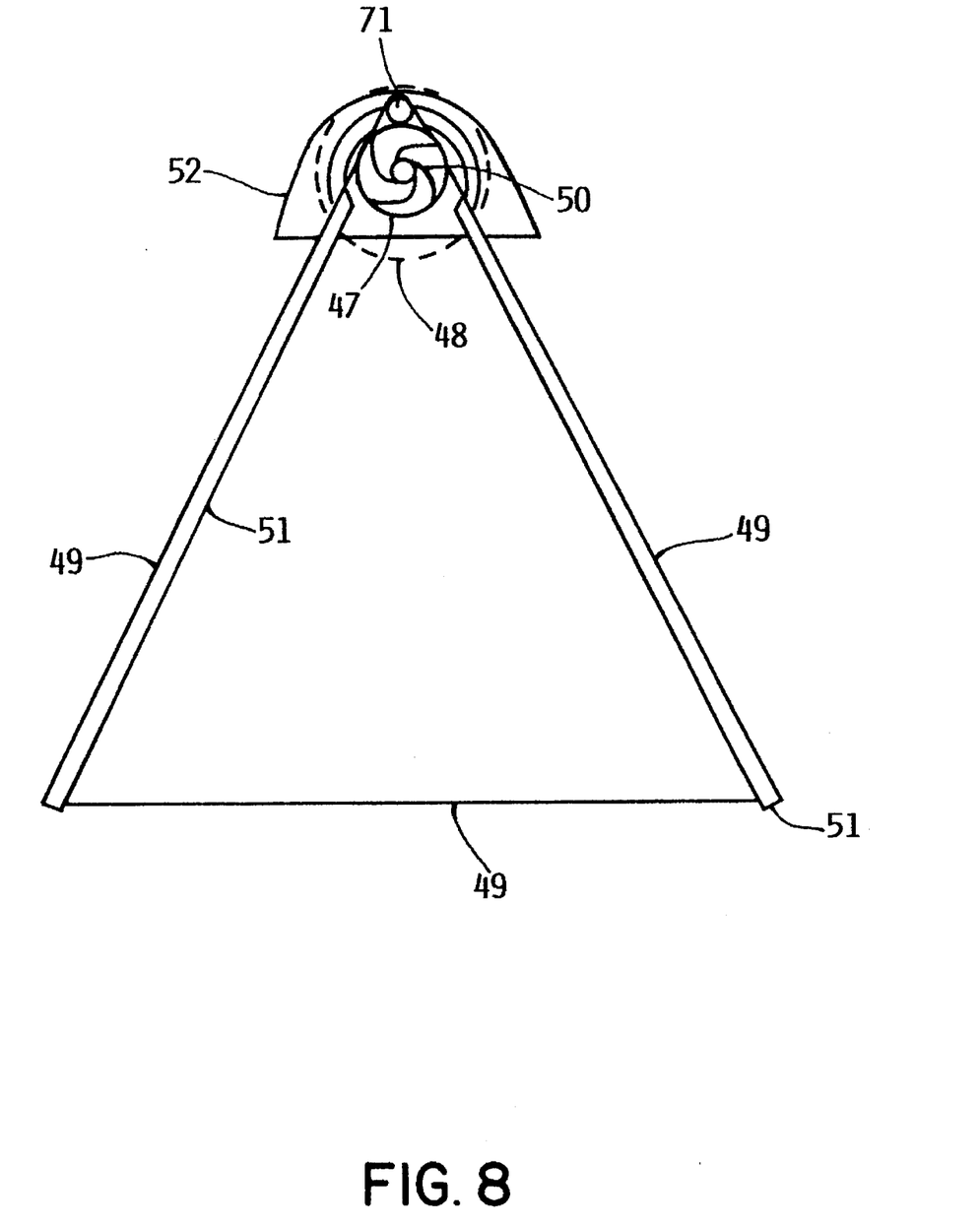
FIG. 8 is an enlarged top plan view of the rotatable harvester head.

The harvester head 69 of the conveyor means 64 has a V-shape for gathering a portion of macrophytes off the surface of the channel of water 8 and for directing the macrophytes to the exposed end of the auger screw 50. FIGS. 6, 7, 8. At the top end of the harvester head 69 is the harvester head coupling 48 for rotatably connecting the harvester head 69 with the auger housing 47 of the auger 77. The harvester head coupling 48 controls harvester head 69 rotation, orientation and the harvester head gathering arms 51 aperture. Near the bottom end of the harvester head 69 are at least two permeable harvester head gathering arms 51. One end of each the harvester head gathering arms 51 is pivotally fixed to the harvester head rear collector housing 52 by a hinge 71 shown in FIG. 8. The outer end of each the harvester head gathering arms 51 is connected to and delimited by the harvester head arm support 49. The harvester head arm support 49 is connected with the harvester head 69 below the harvester head coupling 48 and is connected to each of the harvester head gathering arms 51 so that when the harvester head arm support 49 is tightened, each outer end the harvester head gathering arms 51 is urged closer together for gathering a smaller portion of macrophytes. Thus, the amount of macrophytes gathered from the channel of water 8 by the harvester head 69 is controlled by the size of the opening in the V-shape created by the harvester head gathering arms 51.

The means for dispensing macrophytes includes two large droplet, high volume, final water jet heads 45 with a high release angle. The water jet heads 45 are fed by the water jets pipe 42 that fluidly communicates via a flexible pressure hose 41 to a hose spool 39 on which the pressure hose is wound. This hose spool is supported by rigid support structures 46 connected to the main pipe span 34. The water supply comes to the main pipe span 34 through a fluid communication with the central support. 2 on the central island 13.

In operation, plant growth nutrient water is directed through the buried inflow main 73 up the inflow standpipe 10 into the inlet end 3 of the basin structure 58. The concentration of nutrients in the water at the inlet end 3 is controlled by allowing a greater or lesser concentration of plant growth nutrient water to recycle into the inlet end 3 from the outlet end 4 for mixing. The water then flows under substantially plug-flow conditions through the continuously spiraling channel of water 8 to the outlet end 4 with a detention time of at least 20 days.

As the rotatable arm 62 rotates about the central support 2, the conveyor means 64 translates along the trough 54 to remain in the center of the channel of water 8 as the arm 62 rotates. A portion of the floating macrophytes on the water surface is collected by both of the harvester head gathering arms 51 and passes to the harvester head rear collector housing 52 where macrophytes are lifted by the auger screw 50 to be deposited into the harvester trough 54. The harvester head gathering arms 51 can be adjusted to collect from 5% to 50% of the macrophytes as the harvester head 69 passes along the channel of water 8. Water is sluiced from the central island 13 side of the trough 54 toward the other end of the trough 54 beyond the periphery of the basin structure 58. Macrophytes deposited in the trough 54 by the conveyor means 64 flushes to the edge of the basin structure 58 where the macrophytes can be collected for transport or processing The conveyor means 64 can pass through the entire channel of water 8 one or several times per day. The proportion of macrophytes harvested can be controlled by adjustments to the length of the harvester head arm support 49 of the harvester head 69 and by adjusting the speed at which the rotatable arm 62 rotates.

The large droplet water jets heads 45 redistribute the macrophytes after the conveyor means 64 has passed through an area in the channel of water 8 to immediately promote additional macrophyte cover. The basin structure 58 is seeded with macrophytes such as duckweed which are allowed to grow out to a complete cover of the water surface sufficient to suppress algal populations and which permit the continuous harvest of approximately 1000 kg of macrophytes per hectare of water surface area per day. This condition is achieved with a standing crop of approximately 6 to 10 metric tons of macrophytes per hectare.

The entire apparatus described here can be constructed as a single unit or several units can be combined into a variety of arrangements in which units are constructed in series, in parallel, or in any combination of series and parallel arrangement.

Although the present invention has been described with reference to preferred embodiments, workers skilled in the art will recognize that changes may be made in form and detail without departing from the spirit and scope of the invention. Thus, the scope of the invention should be determined by the appended claims and their legal equivalents, rather than by the example given.

We claim:

1. An apparatus for the culture of aquatic macrophytes in water having plant growth nutrients, said apparatus comprising:

a. a basin structure of generally circular shape which presents a double path in a generally spiral shape, and said double path defines a single continuous channel of water from an inlet end at the periphery of the basin to the center of said basin and then back to an outlet end adjacent to the inlet end at the periphery of the basin;

b. a rotatable arm attached to a support central to said basin said rotatable arm extending beyond the periphery of said basin, said rotatable arm being fully rotatable around said central support, and said rotatable arm bearing a trough which extends beyond said berms;

c. a conveyor means which gathers macrophytes from the water and conveys the macrophytes onto said trough whereby the macrophytes are conveyed beyond said berms; and, d. means for dispersing said macrophytes over the surface of the water after a portion of said macrophytes has been harvested.

2. An apparatus for the culture of aquatic macrophytes as recited in claim 1, further comprising a pipe and pump fluidly communicating with said outlet end and said inlet end whereby the concentration of growth nutrients of said water through said channel can be controlled.

3. An apparatus for the culture of aquatic macrophytes as recited in claim 1, wherein said double path is defined by parallel berms.

4. An apparatus for the culture of aquatic macrophytes as recited in claim 3, wherein said berms being constructed of materials selected from a class consisting of earth, masonry, brick, stone, concrete aggregate, or any combination thereof.

5. An apparatus for the culture of aquatic macrophytes as recited in claim 3, wherein said berms include the root systems of vegetation and vegetation to create an effective wind break.

6. An apparatus for the culture of aquatic macrophytes as recited in claim 1, wherein said conveyor means comprises a harvester head, an auger and a tram.

7. An apparatus for the culture of aquatic macrophytes in water having a higher than desirable level of plant growth nutrients, said apparatus comprising:

a. a basin structure of generally circular shape which presents a defined double path in a generally spiral shape, said path defined by two substantially parallel berms, said berms define a single continuous channel of water from an inlet end at the periphery to an outlet end adjacent to the inlet end, and said double path allowing water to flow from the periphery of the basin to the center of said basin and then back to the periphery of the basin;

b. a pipe and pump fluidly communicating said outlet end and said inlet end whereby the rate of flow of said water through said channel can be controlled;

c. a rotatable arm attached to a support central to said basin said rotatable arm extending to beyond the periphery of said basin, said rotatable arm being fully rotatable around said central support, said rotatable arm bearing a trough which slopes downwardly toward a trough outlet, said trough outlet being outside said periphery;

d. a conveyor means which can gather macrophytes from said channel and convey them to said trough whereby they will slide to said trough outlet; and, e. means for dispersing said macrophytes over the surface of the water in said channel after a portion of said macrophytes has been harvested.

* * * * *